(12) United States Patent
Katayama

(10) Patent No.: US 10,694,093 B2
(45) Date of Patent: Jun. 23, 2020

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Tatsushi Katayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 16/040,722

(22) Filed: Jul. 20, 2018

(65) Prior Publication Data
US 2018/0332214 A1 Nov. 15, 2018

Related U.S. Application Data

(63) Continuation of application No. PCT/JP2016/083651, filed on Nov. 14, 2016.

(30) Foreign Application Priority Data

Jan. 29, 2016 (JP) .................................. 2016-016169

(51) Int. Cl.
H04N 5/232 (2006.01)
G02B 7/34 (2006.01)
(Continued)

(52) U.S. Cl.
CPC ........... *H04N 5/23212* (2013.01); *G02B 7/34* (2013.01); *G03B 13/36* (2013.01);
(Continued)

(58) Field of Classification Search
None
See application file for complete search history.

(56) References Cited

U.S. PATENT DOCUMENTS 9,110,576 B1* 8/2015 Kim .................... G06F 3/04883
2008/0131019 A1* 6/2008 Ng ............................. G06T 5/50
382/255
(Continued)

FOREIGN PATENT DOCUMENTS

JP 2013-145314 A 7/2013
JP 2015-023552 A 2/2015
(Continued)

OTHER PUBLICATIONS

The above foreign documents 2-4 were cited the International Search Report of PCT/JP2016/083651 dated Jan. 24, 2017.

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

There is provided an image processing apparatus. A focal position determining unit determines, for each of a plurality of captured image data, a focal position in a depth direction at a target position. The focal position determining unit determines a position at which a subject at the target position is in focus as the focal position if a first focus mode has been selected by a selecting unit, and determines the focal position for each of the plurality of captured image data such that the focal positions track a position at which a subject at the target position is in focus at a speed that is less than or equal to a threshold value, in an order of generation of the plurality of captured image data, if a second focus mode has been selected by the selecting unit.

11 Claims, 10 Drawing Sheets

(51) Int. Cl.
*G03B 13/36* (2006.01)
*H04N 5/378* (2011.01)

(52) U.S. Cl.
CPC ..... *H04N 5/23216* (2013.01); *H04N 5/23218* (2018.08); *H04N 5/23229* (2013.01); *H04N 5/23245* (2013.01); *H04N 5/23293* (2013.01); *H04N 5/232133* (2018.08); *H04N 5/232933* (2018.08); *H04N 5/378* (2013.01)

(56) References Cited

U.S. PATENT DOCUMENTS

| | | | |
|---|---|---|---|
| 2010/0128145 A1* | 5/2010 | Pitts | H04N 5/23212 |
| | | | 348/231.99 |
| 2012/0249854 A1* | 10/2012 | Miyakawa | H04N 5/23212 |
| | | | 348/333.01 |
| 2013/0222633 A1* | 8/2013 | Knight | H04N 5/23212 |
| | | | 348/222.1 |
| 2013/0329124 A1* | 12/2013 | Nagamatsu | H04N 5/23212 |
| | | | 348/349 |
| 2014/0086551 A1* | 3/2014 | Kaneko | H04N 5/2173 |
| | | | 386/230 |
| 2016/0309091 A1* | 10/2016 | Kigure | H04N 5/23293 |
| 2016/0360226 A1* | 12/2016 | Fishwick | H04N 19/56 |
| 2017/0034421 A1* | 2/2017 | Yamazaki | H04N 5/23212 |

FOREIGN PATENT DOCUMENTS

| | | |
|---|---|---|
| JP | 2015-208001 A | 11/2015 |
| WO | 2014/010672 A1 | 1/2014 |

* cited by examiner

F I G. 2A
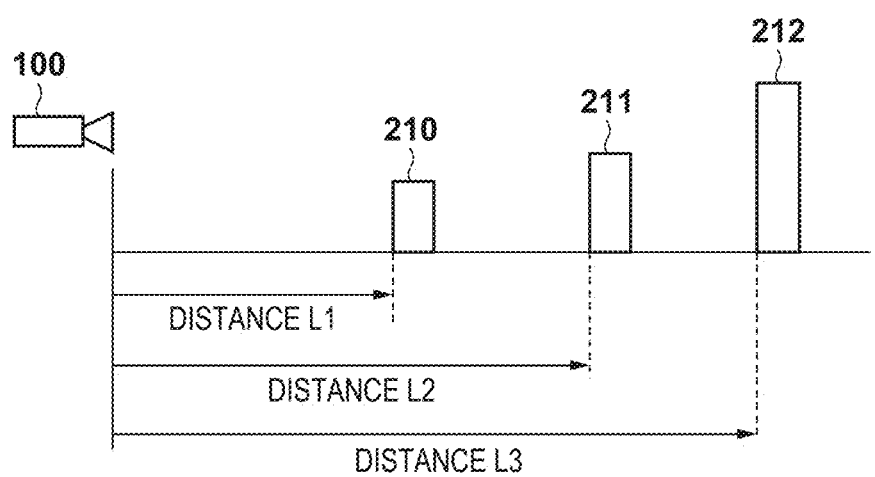
F I G. 2B
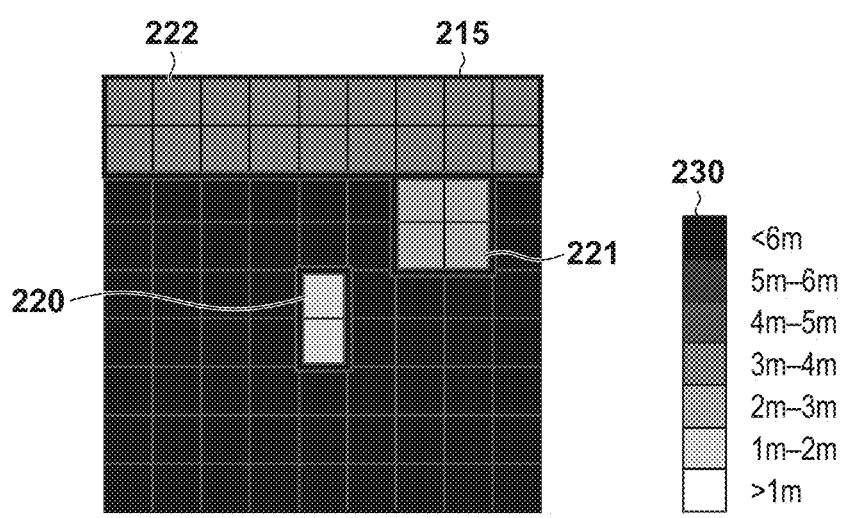

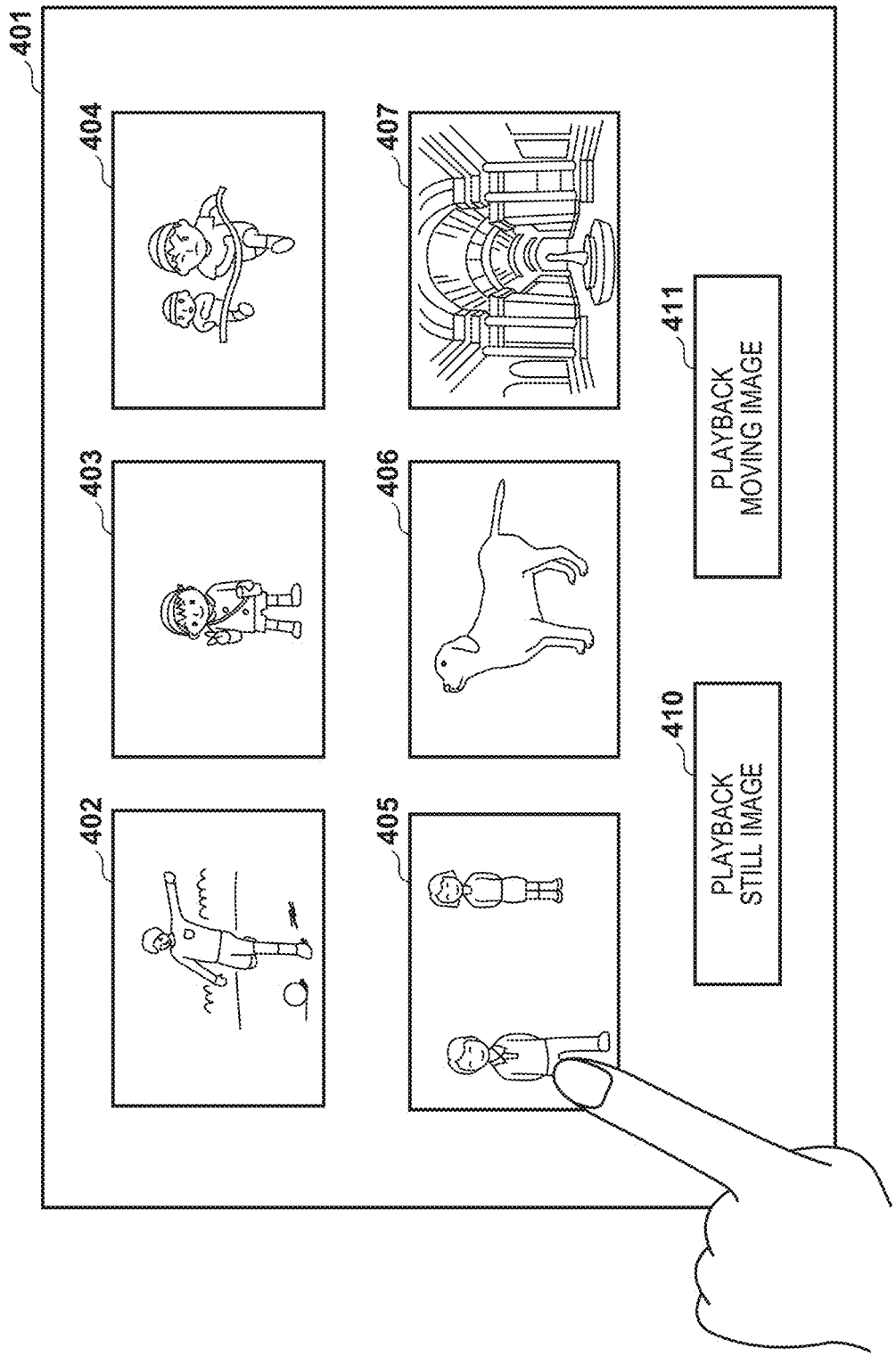

IMAGE PROCESSING APPARATUS, IMAGE CAPTURING APPARATUS, IMAGE PROCESSING METHOD, AND STORAGE MEDIUM

CROSS-REFERENCE TO RELATED APPLICATIONS

This application is a Continuation of international Patent Application No. PCT/JP2016/083651, filed Nov. 14, 2016, which claims the benefit of Japanese Patent Application No. 2016-016169, filed Jan. 29, 2016, both of which are hereby incorporated by reference herein in their entirety.

BACKGROUND OF THE INVENTION

Field of the Invention

The present invention relates to an image processing apparatus, an image capturing apparatus, an image processing method, and a storage medium.

Background Art

In recent years, in image capturing apparatuses, such as digital cameras, technology for generating images in which any subject is focused after shooting has been proposed (see Patent Literature 1). The image capturing apparatus of Patent Literature 1 generates moving image output data in which incident light from various directions is separated and recorded, by imaging the light beams passing through different pupil regions of an image capturing optical system on the pixels of an image sensor through a micro lens array. Subsequently, the image capturing apparatus generates a moving image focused on a particular subject from the moving image recording data.

CITATION LIST

Patent Literature

PTL1: Japanese Patent Laid-Open No. 2013-145314

Still images and moving images require different focus control to obtain high quality images. In the case of still images, accurate focus on the subject results in an improved image quality. On the other hand, in the case of moving images, continuity in the direction of time influences the image quality. Therefore, if the subject moves fast, gradually focusing on the subject by restraining the tracking speed results in an improved image quality.

However, while Patent Literature 1 discloses the generation of moving images, it does not consider generating a still image from each frame of moving image recording data. No technology has been proposed for performing focus control after shooting according to the use of the moving image output data.

SUMMARY OF THE INVENTION

The present invention was made in the light of the foregoing circumstances and provides technology for, when generating images from captured image data, allowing for performing focus control according to the use of the images.

A first aspect of the present invention provides an image processing apparatus comprising: one or more processors; and a memory storing instructions which, when executed by the one or more processors, cause the image processing apparatus to function as: an acquiring unit configured to acquire a plurality of captured image data successively generated by an image capturing unit; a target position determining unit configured to determine, for each of the plurality of captured image data, a target position within an image of each captured image data; a selecting unit configured to select a first focus mode or a second focus mode; a focal position determining unit configured to determine, for each of the plurality of captured image data, a focal position in a depth direction at the target position; and a generating unit configured to generate, for each of the plurality of captured image data, an image which is in focus at the determined focal position and is out of focus at other positions, from the captured image data, wherein the focal position determining unit: determines a position at which a subject at the target position is in focus as the focal position if the first focus mode has been selected by the selecting unit; and determines the focal position for each of the plurality of captured image data such that the focal positions track a position at which a subject at the target position is in focus at a speed that is less than or equal to a threshold value, in an order of generation of the plurality of captured image data, if the second focus mode has been selected by the selecting unit.

A second aspect of the present invention provides an image processing method performed by an image processing apparatus, comprising: acquiring a plurality of captured image data successively generated by an image capturing unit; determining, for each of the plurality of captured image data, a target position within an image of each captured image data; selecting a first focus mode or a second focus mode; determining, for each of the plurality of captured image data, a focal position in a depth direction at the target position; and generating, for each of the plurality of captured image data, an image which is in focus at the determined focal position and is out of focus at other positions, from the captured image data, wherein in the determining of the focal position: a position at which a subject at the target position is in focus is determined as the focal position if the first focus mode has been selected in the selecting; and the focal position for each of the plurality of captured image data is determined such that the focal positions track a position at which a subject at the target position is in focus at a speed that is less than or equal to a threshold value, in an order of generation of the plurality of captured image data, if the second focus mode has been selected in the selecting.

Further features of the present invention will become apparent from the following description of exemplary embodiments with reference to the attached drawings.

BRIEF DESCRIPTION OF THE DRAWINGS

The accompanying drawings are included in, and constitute part of, the specification, show embodiments of the present invention, and are used to describe the principle of the present invention in conjunction with the description thereof.

FIG. 2A is a view that describes information about the distances of subjects.

FIG. 2B is a view that describes information about the distances of the subjects.

FIG. 4 is a schematic diagram of thumbnail images displayed on a display unit 107.

DESCRIPTION OF THE EMBODIMENTS

Embodiments of the present invention will be described hereinafter with reference to the attached drawings. It should be noted that the technical scope of the present invention is defined by the claims and, is not limited by the following respective embodiments. Moreover, not all the combinations of the aspects described in the embodiments are necessarily essential to the present invention.

It should be noted that each of the embodiments will be described below based on an image capturing apparatus that includes a configuration of an image processing apparatus that executes refocus processing during playback. However, the image processing apparatus may be separated from the image capturing apparatus. In this case, the image processing apparatus acquires captured image data and the like from the image capturing apparatus and performs various image processing, such as refocus processing, based on the captured image data and the like that have been acquired.

Furthermore, in the each of the following embodiments, it is assumed that the image capturing apparatus performs shooting at an aperture for pan focus to enable refocus processing during playback and generates RAW image data as the captured image data. The image capturing apparatus performs blurring processing on each position of the captured image in pan focus based on the difference between the distance of the subject at that position (which is the position in the depth direction where the subject is in focus, or can also be the phase difference or the amount of defocus) and the target focus distance (the focal position). Specifically, blurring processing is performed to blur the image in a focused state in which the area corresponding to the target focus position is in focus so that the areas corresponding to other positions in the depth direction are blurred according to the depths, making it possible to obtain the mimicked effect of refocus processing with respect to the target focus position. At this time, a configuration is possible in which the range of focus in the depth direction, that is, the depth of field can be set in advance. The method of implementing refocus processing is not limited to this, nor is the captured image data generated by the image capturing apparatus limited to RAW image data obtained from a standard single-lens image sensor. For example, the image capturing apparatus may also be one that generates data having information about the light-beam intensity and angle information (light field data) obtained by separating and recording the incident light from various directions with the image capturing system of Patent Literature 1 or an image capturing system using a multiple-lens image sensor, etc. In this case, refocus processing may also be performed by rearranging the data on each pixel so as to correspond to a desired focus distance based on the obtained light field data.

First Embodiment

Figure 1:
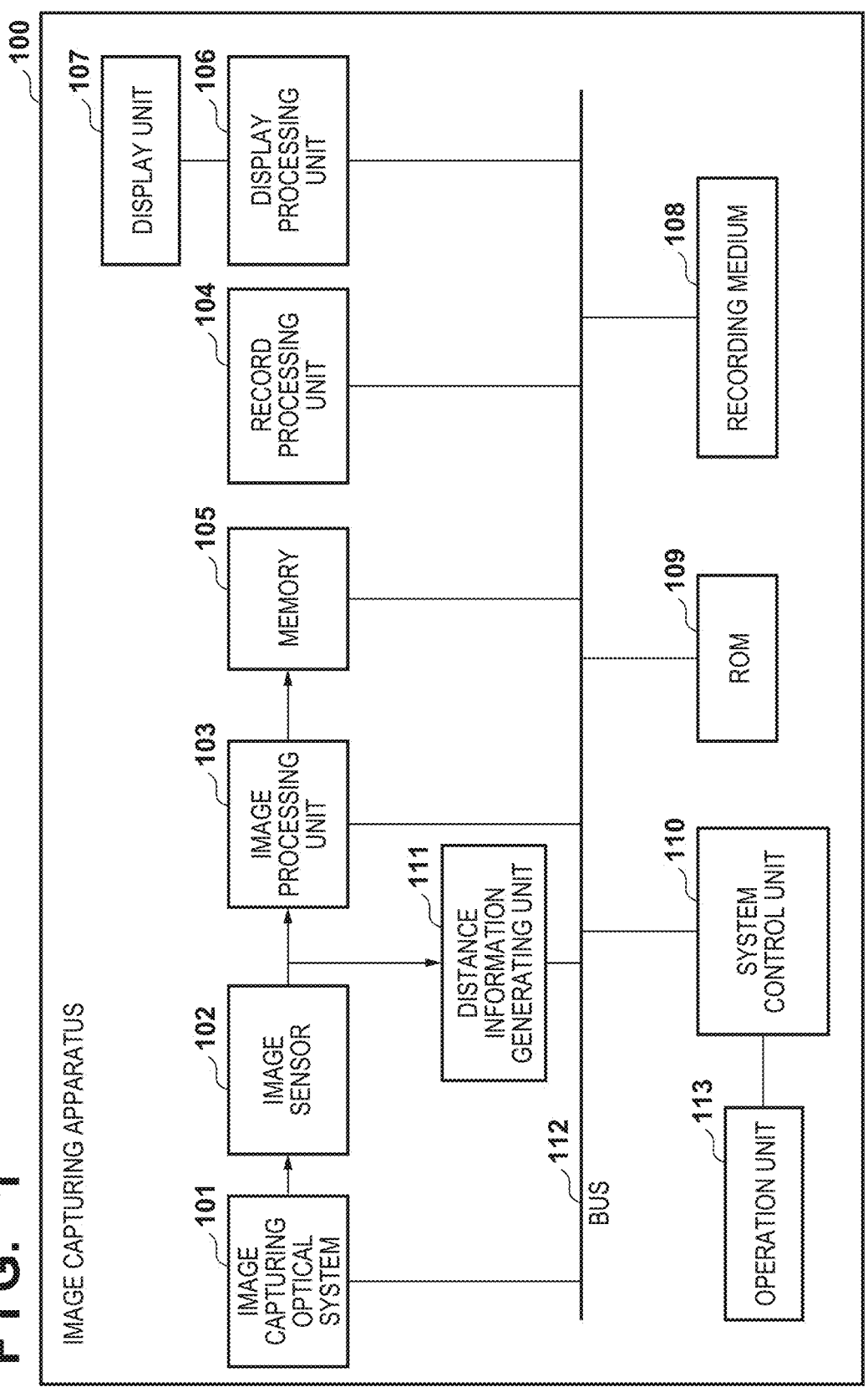
FIG. 1 is a block diagram of an image capturing apparatus 100.

FIG. 1 is a block diagram of an image capturing apparatus 100 according to a first embodiment of the present invention.

In FIG. 1, an image capturing optical system 101 is configured to perform lens control according to operations, such as zooming, focusing. An image sensor 102 is comprised of a CMOS, etc. The image sensor 102 is configured to acquire a phase difference signal for AF (auto focus) for each pixel by dividing and capturing a signal for the pixel on the image capturing surface. It is possible to acquire information about the distance of the subject to be shot by using the phase difference signals output from the image sensor 102. A distance information generating unit 111 calculates information about the distance of the subject based on the phase difference signals output from the image sensor 102 and writes the calculated information to a memory 105.

An image processing unit 103 generates digital data by performing A/D conversion on the image signals output from the image sensor 102 and generates RAW image data by performing predetermined processing on this digital data. The RAW image data is temporarily held in the memory 105. In the recording mode, the image processing unit 103 performs development processing for display in order to display the video being shot on the display unit 107, such as a liquid crystal panel. Any known technology can be used for the generation and development processing of RAW image data. Moreover, the image processing unit 103 performs refocus processing during playback of RAW image data (which will be described in detail later).

The memory 105 is comprised of a DRAM, etc., and holds recording data generated by a record processing unit 104, the program for controlling the image capturing apparatus 100, and the resource data, such as characters and icons, to be displayed on the display unit 107.

The record processing unit 104 reads out the RAW image data and the information about the distance of the subject held in the memory 105, converts them to a predetermined record format, and writes them to a recording medium 108. A display processing unit 106 performs processing to display the video being shot, icons, and characters, etc., held in the memory 105 on the display unit 107. The display unit 107 is comprised of a liquid crystal panel, etc. The recording medium 108 is a non-volatile semiconductor memory, such as an SD memory card.

A system control unit 110 is comprised of a CPU, etc. and controls the entirety of the image capturing apparatus 100. A ROM 109 (read-only memory) holds a control program, character fonts, icon resource data, etc. A bus 112 is a bus for connecting each of the units of the image capturing apparatus 100 to exchange data. The entirety of the image capturing apparatus 100 can be controlled by transmitting control signals from the system control unit 110 to the image capturing apparatus 100 via the bus 112. An operation unit 113 includes buttons and dials, etc., and is used for operational instructions to start recording and stop recording, etc., and for various setting instructions, Additionally, the touch panel mounted on the liquid crystal panel of the display unit 107 is also considered to be included in the operation unit 113.

The recording operation of the image capturing apparatus 100 according to this embodiment will be now described. The system control unit 110 switches over to perform control in the recording mode upon detecting that a mode setting dial (not shown) of the operation unit 113 has been set to the recording mode. In the recording mode, the image capturing apparatus 100 displays the image of the subject being shot on the display unit 107 to allow the user to confirm the conditions of the shooting. For that purpose, the image processing unit 103 performs predetermined development processing on the data generated by the image sensor 102 from the image of the subject incident via the image capturing optical system 101 and outputs the resultant data to the memory 105. The display processing unit 106 converts the data in the memory 105 and displays the converted data on the display unit 107. Additionally, in this embodiment, it is assumed that images recorded in the recording medium 108 are RAW image data. Then, the image processing unit 103 generates RAW image data by performing predetermined processing on the data output by the image sensor 102 and temporarily stores the RAW image data it in the memory 105. Subsequently, the record processing unit 104 converts the RAW image data to a predetermined record format and records the converted data in the recording medium 108.

Additionally, in this embodiment, the user is not required to distinguish moving images from still images during shooting. Upon receiving an instruction to start recording from the user via the operation unit 113, the image capturing apparatus 100 successively generates and records RAW image data, for example, at a frame rate of 60 fps. During shooting, the system control unit 110 performs focus control independently from the type of the images (moving images or still images). For example, the system control unit 110 sets the aperture of the image capturing optical system 101 to a predetermined setting value to set the focus to pan focus, and also acquires RAW image data while controlling the image sensor 102 and the image processing unit 103. It should be noted that the aperture may also be adjusted as required according to the subject so as to capture images in pan focus. During playback of RAW image data, the user selects a still image playback mode (the first focus mode) or a moving image playback mode (the second focus mode). The still image playback mode is a playback mode for playing back RAW image data as still images, and the moving image playback mode is a playback mode for playing back RAW image data as moving images. The image capturing apparatus 100 performs development processing and refocus processing on the RAW image data according to the selected playback mode to generate playback images. To enable refocus processing during playback, the image capturing apparatus 100 acquires information about the distance of each subject of the RAW image data to be recorded (which will be described in detail below) and record the information together with the RAW image data.

The information about the distances of subjects will be described hereinafter with reference to FIGS. 2A and 2B. FIG. 2A is a schematic diagram showing the positions of the image capturing apparatus 100 and subjects 210 to 212. The distances between the image capturing apparatus 100 and the subjects 210 to 212 are distances L1 to L3, respectively. As described above, the image sensor 102 of the image capturing apparatus 100 is configured to acquire a phase difference signal for each pixel by dividing and capturing a light beam from the emission pupil region of the image capturing optical system 101 with a plurality of photoelectric conversion elements to capture a signal for the pixel on the image capturing surface. The distance information generating unit 111 generates information about the distances to the subjects being shot at a predetermined resolution based on the phase difference signals acquired from the image sensor 102. It should be noted that any known technology may be used to generate distance information by phase difference detection on an image capturing surface.

FIG. 2B is a schematic diagram of a distance map 215 representing, as a two-dimensional image information, distance information that is acquired if shooting is performed with the arrangement FIG. 2A. The distance map 215 shows numerical values that represent distances as the gradations of images, indicating that the darker the subject is, at the further depth (the farther location from the image capturing apparatus 100) the subject is located. The distance data 220 to 222 are densities representing the distances to the subjects 210 to 212 of FIG. 2A. The density levels 230 indicate the relationship between the densities on the distance map 215 and the distances to the subjects.

It should be noted that the format of the distance information is not limited to the distance map 215; it is possible to use any format that at least relatively indicates the distance from the image capturing apparatus 100 to each subject in the image. For example, as the relative relationship in distance for each region is found upon obtaining a phase difference (the image shifts between image signals from the photoelectric conversion elements) map based on the phase difference signal acquired from the image sensor 102, the phase difference map may be stored as a distance map 215 as is. Additionally, a defocus map on which a phase difference map is converted to the amounts of defocus based on a conversion coefficient (k-value) based on the optical transfer characteristics of the image capturing optical system 101 may also be stored as a distance map 215. In this embodiment, a distance map of the distances of subjects where the aforementioned amounts of defocus have been further converted to the distances of the subjects based on information, such as the lens position of the image capturing optical system 101, is treated as the distance map 215. Additionally, the resolution of the distance information is not limited to that shown in FIG. 2B. The distance information will be sufficient as long as it indicates the distances (or the phase differences, the amounts of defocus, etc.) of the subjects in a plurality of positions in the captured image, such that the range covered by the distance information at each position is suitably determined according to the resolution.

The distance map 215 generated by the distance information generating unit 111 is temporarily held in a predetermined region of the memory 105. Then, the record processing unit 104, under the control of the system control unit 110, records the distance map 215 held in the memory 105 into the recording medium 108 together with the RAW image data held in the memory 105. The RAW image data and the distance map 215 are generated based on the signals output from the image sensor 102 at the same timing. Accordingly, when the image capturing apparatus 100 generates a plurality of RAW image data, the same number of distance maps 215 as that of the RAW image data are generated.

It should be noted that if the image capturing apparatus 100 generates light field data as captured image data, phase difference information can be acquired from the light field data. Accordingly, the image capturing apparatus 100 is not required to generate distance information during shooting.

In this embodiment, the system control unit 110 starts recording operation upon detecting that the record button (not shown) of the operation unit 113 is pressed in the recording mode. Once the recording operation is started, the system control unit 110 generates a file in a predetermined format, sets header information, etc., and then performs recording in the recording medium 108. As described above, in this embodiment, the user is not required to distinguish moving images from still images during shooting. During recording, the image capturing apparatus 100 successively generates RAW image data and distance maps 215 at a frame rate of 60 fps and temporarily stores them in the memory 105, and the record processing unit 104 records the RAW image data and distance maps 215 in the recording medium 108 at a predetermined timing. If there is any meta information, etc., to be added to the recording frames, the record processing unit 104 records it in the recording medium 108 at the same time.

Now, when detecting that the record button (not shown) of the operation unit 113 is pressed again, the system control unit 110 records in the recording medium 108 the RAW image data and the distance map 215 corresponding to the image signals output from the image sensor 102 at that time. Subsequently, the system control unit 110 stops the recording operation.

The playback processing performed by the image capturing apparatus 100 will now be described with reference to the flowchart of FIG. 3. Unless otherwise specified, the processing in the steps of this flowchart are performed by the system control unit 110 executing the control program to control each unit of the image capturing apparatus 100. The process of this flowchart starts when the system control unit 110 receives a playback instruction from the user via the operation unit 113.

In S301, the system control unit 110 selects an image file to be played back according to the user instruction. To that end, the system control unit 110 displays a list of image files recorded in the recording medium 108 as thumbnail images on the display unit 107. The following describes the generation of the thumbnail images. The system control unit 110 reads out the image files recorded in the recording medium 108. The system control unit 110 holds, in the memory 105, the top RAW image data on the series of RAW image data in the image files that have been read out. Next, the image processing unit 103 performs development processing on the RAW image data and writes thumbnail images that are reduced to a predetermined size to the memory 105. Then, the display processing unit 106 displays the thumbnail images held in the memory 105 on the display unit 107.

FIG. 4 is a schematic diagram of the thumbnail images displayed on the display unit 107. In FIG. 4, the display screen 401 is displayed on the liquid crystal panel with a touch panel affixed thereto. Thumbnail images 402 to 407 are being displayed on the display screen 401.

The user selects the image to be played back from the displayed thumbnail images displayed on the display screen 401. In the example in FIG. 4, the user is selecting the thumbnail image 405 by touching the touch panel. The operation unit 113 receives a signal from the touch panel, converts this signal to information about the coordinates on the display screen 401, and outputs the information to the system control unit 110. The system control unit 110 detects the thumbnail image being touched based on the coordinate information and identifies the image file that corresponds to the thumbnail image. At this time, the system control unit 110 may highlight the selected thumbnail image on the display screen 401.

Next, in S302, the system control unit 110 selects a playback mode according to the user instruction. The user makes a selection by touching one of the still image playback button 410 and the moving image playback button 411 displayed on the display screen 401 in FIG. 4. The system control unit 110 determines the playback mode by detecting which of the still image playback button 410 and the moving image playback button 411 has been touched based on the coordinates touched by the user. It should be noted that, in this embodiment, while the description is given on the assumption that either the still image playback mode or the moving image playback mode is selected as the playback mode, the selectable playback modes are not limited to these. A playback mode can be selected from two or more playback modes and all setups whose focus controls vary according to the selected playback mode may be included in this embodiment.

Figure 5A:
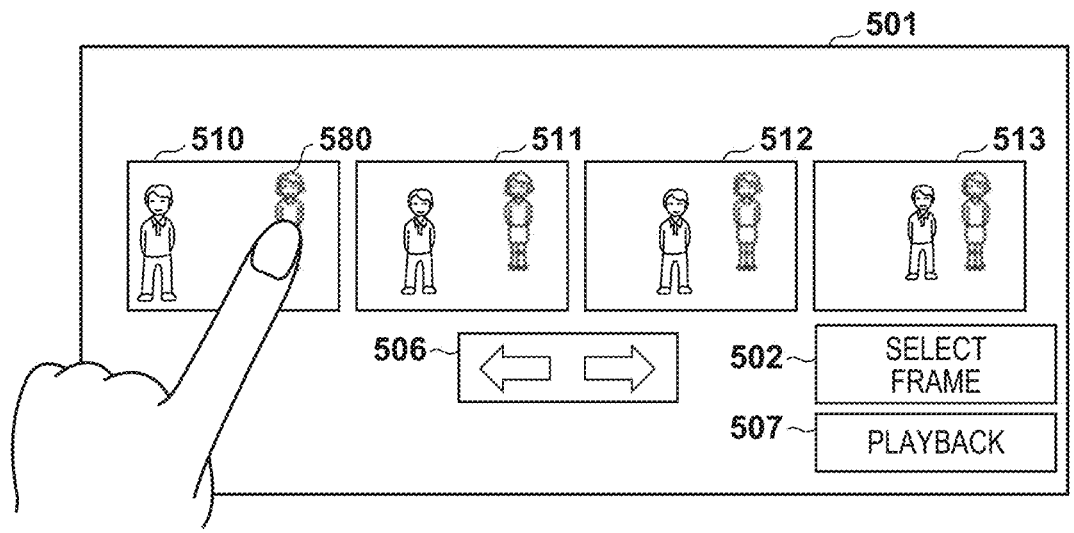
FIG. 5A is a view showing a subject selection screen 501.

In S303, the system control unit 110 selects the subject to be focused according to the user instruction. FIG. 5A is a schematic diagram of the display screen to allow the user to select the subject to be focused. The system control unit 110 reads out the RAW image data at a predetermined frame interval from the image file to be played back, which has been selected in S301. Then, the system control unit 110 performs development and generates and displays thumbnail images on the display unit 107 in the same procedure as in S301. Arranged on the subject selection screen 501 in FIG. 5A are thumbnail images 510 to 513 generated from the frames that are read out from the image file at an interval of 60 frames, i.e., every one second. If not all the thumbnail images fit in the subject selection screen 501, the user may view the other thumbnail images by touching the right and left button 506 on the touch panel to scroll the screen laterally. The user selects the subject to be focused by touching the subject in the thumbnail images arranged on the subject selection screen 501. In the example in FIG. 5A, the subject 580 in the thumbnail image 510 is being selected. The user can select a subject in each frame by scrolling the screen and repeating the same operation as described above. The system control unit 110 holds the information about the position of the selected subject in the memory 105 associated with the frame number. The position information and the frame number held at this point are hereinafter also referred to as the "refocus data."

It should be noted that, in this embodiment, while the description is given on the assumption that the position of the subject selected by the user is used as the target position for focusing in the refocus processing, this embodiment is not limited to this. The image capturing apparatus 100 may determine the target position for focusing in the refocus processing based on any criteria.

Figure 5B:
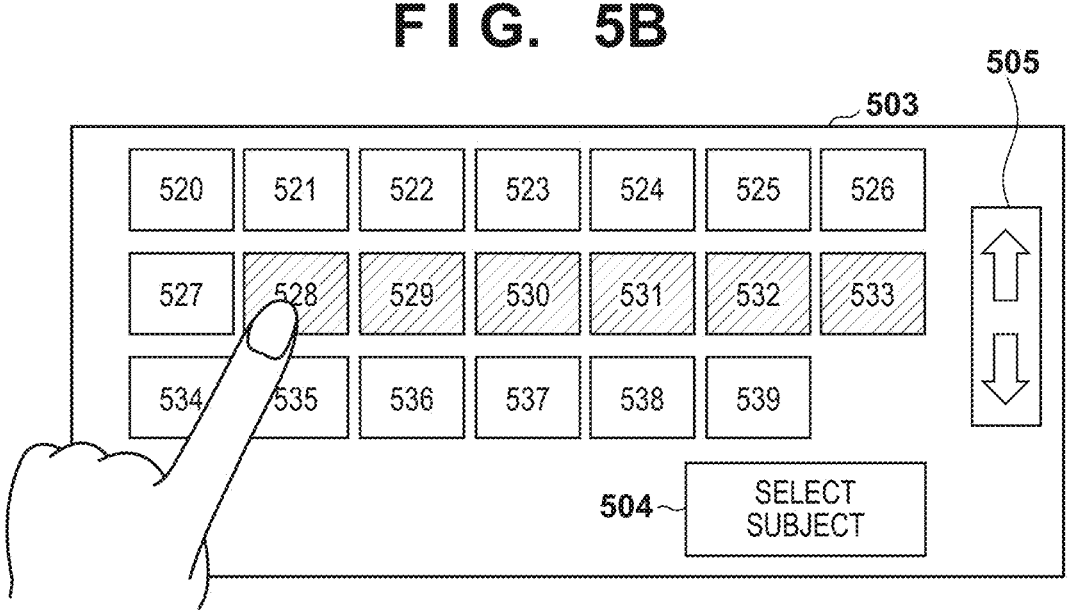
FIG. 5B is a view showing a frame selection screen 503.

Additionally, in S303, the user can select frames to be played back from the image file. The user presses the frame selection button 502 in FIG. 5A. Upon detecting the pressing, the system control unit 110 displays the frame selection screen 503 shown in FIG. 5B. Thumbnail images corresponding to the frames in the image file to be played back are shown at an interval of one second on the frame selection screen 503. Here, the thumbnail images 520 to 539 are displayed. If not all the thumbnail images fit in the frame selection screen 503, the user may cause the other thumbnail images to appear by touching the up and down button 505 on the touch panel to scroll the screen vertically. The user selects the frames to be played back by touching them on the frame selection screen 503. In the example in FIG. 5B, the thumbnail images 528 to 533 are being selected. In this case, the range of frames that corresponds to the thumbnail images 528-533 is selected to be played back. The system control unit 110 stores the information indicating the selected frames in the memory 105. Moreover, the user can move to the subject selection screen 501 in FIG. 5A by pressing the subject selection button 504 on the frame selection screen 503.

It should be noted that all the frames in the image file are played back if no selection is made on the frame selection screen 503. Additionally, in the examples in FIG. 5A and FIG. 5B, while the thumbnail images are displayed at an interval of 60 frames (an interval of one second), the interval at which thumbnail images are displayed can be changed as appropriate.

When the user touches the playback button 507 of the subject selection screen 501, the system control unit 110 advances the process to S304. In S304, the system control unit 110 determines whether or not the still image playback mode was selected in S302. If the still image playback mode was selected, the system control unit 110 advances the process to S305 and, if not, the system control unit 110 advances the process to S306. S305 and S306 will be described in detail below.

In S307, the system control unit 110 determines whether or not to terminate the playback mode. If the playback mode is terminated (for example, if the user instructs the termination of the playback mode through the operation unit 113), the system control unit 110 terminates the process of this flowchart. Otherwise, the system control unit 110 returns the process to S301.

Figure 6:
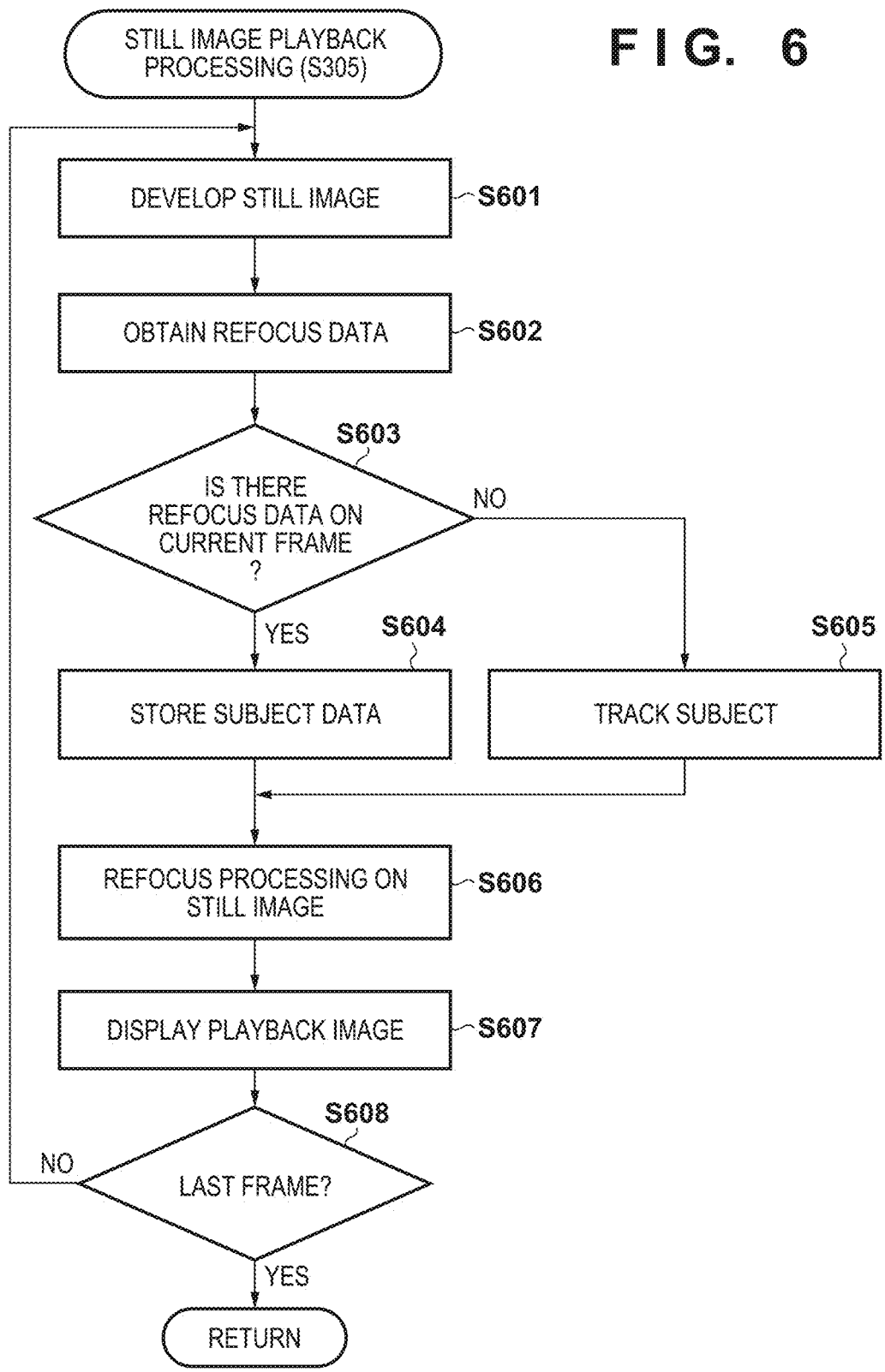
FIG. 6 is a flowchart showing details of still image playback processing (S305 in FIG. 3).

The still image playback processing in S305 will be described with reference to FIG. 6. In S601, the system control unit 110 reads out the RAW image data that corresponds to the frames currently to be processed from the image file to be played back that is recorded in the recording medium 108 and stores the RAW image data in the memory 105. The first frame to be processed is the top frame of the image file (if a range is selected on the frame selection screen 503 in FIG. 5B, it is the top frame in the selected range). Moreover, the system control unit 110 sets, to the image processing unit 103, development parameters that correspond to still image playback, and instructs the image processing unit 103 to perform development processing. The system control unit 110 stores the still image data obtained by the development processing in the memory 105.

In S602, the system control unit 110 acquires refocus data from the memory 105. In S603, the system control unit 110 determines whether or not refocus data that corresponds to the frame currently being processed exists. As described in connection with S303, the refocus data includes position information and a frame number. Therefore, the determination in S603 is made based on the comparison between the frame number of the refocus data and the frame number of the frame currently being processed. If refocus data that corresponds to the frame currently being processed exists, the system control unit 110 advances the process to S604. If refocus data that corresponds to the frame currently being processed does not exist, the system control unit 110 advances the process to S605.

In S604, the system control unit 110 extracts, from the still image data generated in S601, the image data on the subject (the subject data) in the position information included in the refocus data and stores the subject data in the memory 105. This subject data is used for track processing on the subject in S605.

In S605, the system control unit 110 performs tracking processing on the subject. Specifically, the system control unit 110 acquires the subject data that has been stored in the memory 105 in S604. Then, the system control unit 110 detects the position of the subject by searching, in the frame image being processed, for the image of the subject that corresponds to the subject data through matching processing and edge detection, etc. Additionally, the system control unit 110 updates the subject data stored in the memory 105 with the image data of the detected subject. This makes it possible to perform refocus processing on the frames with no corresponding refocus data (captured image data other than those for which refocus data exists) using the subject as a reference. It should be noted that the method of tracking the subject is not limited to the above; any known technology can also be used.

It should be noted that the system control unit 110 may fail to detect the position of the subject, for example, if the subject to be focused is framed out. In this case, the system control unit 110 detects the position of the subject using subject data older than the most recent subject data stored in the memory 105 (that is, the subject data in a frame earlier than in the immediately preceding frame). To enable such a retry of detection processing, the system control unit 110, when storing the subject data in the memory 105 in S604 and updating the subject data in S605, does not delete the old subject data but maintains it. Furthermore, the image capturing apparatus 100 may be configured to delete subject data older than a predetermined number of frames.

Figure 7:
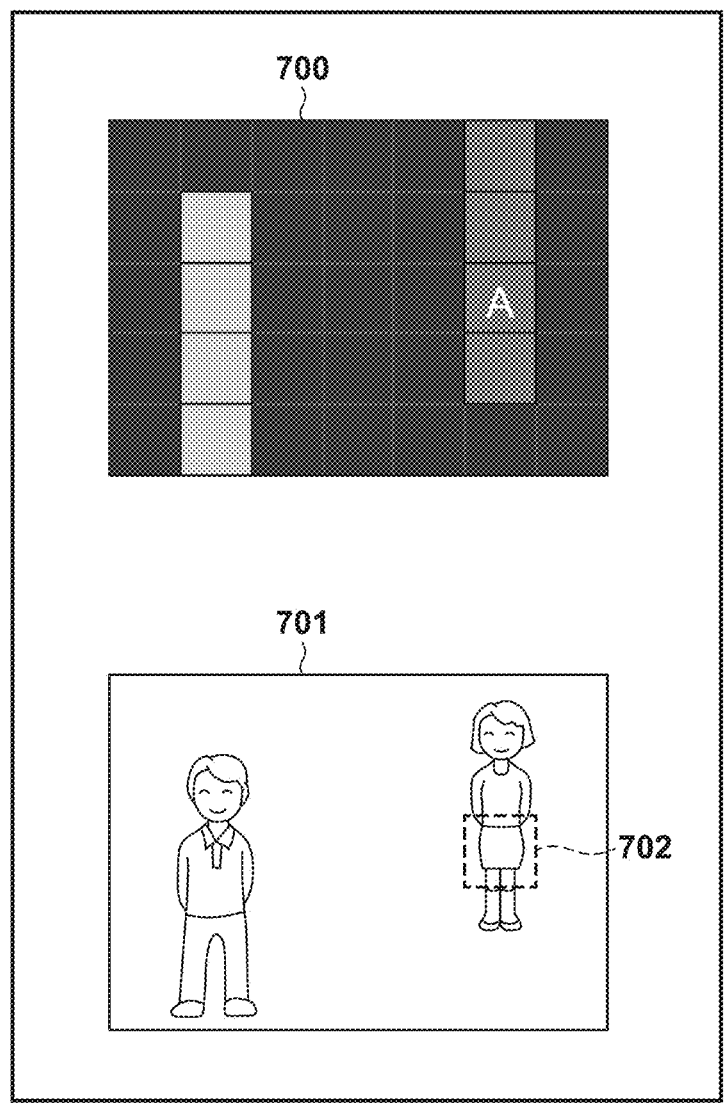
FIG. 7 is a conceptual diagram of still image refocus processing.

In S606, the system control unit 110 performs still image refocus processing. FIG. 7 is a conceptual diagram of still image refocus processing. The image capturing apparatus 100 performs still image refocus processing based on the recorded RAW image data and the distance map corresponding to the RAW image data. The system control unit 110 reads out the distance map that corresponds to the frame number to be processed from the recording medium 108 and stores it in the memory 105. The distance determination of the focus distance is made using the distance map stored in the memory 105.

In the distance map 700 in FIG. 7, the gradation level of each region represents a distance as indicated in the density levels 230 of FIG. 2B. The image 701 in FIG. 7 represents an image corresponding to the distance map 700. The subject region 702 indicates the position of the subject to be focused. This position corresponds to the position information included in the refocus data or to the position detected by the tracking processing in S605. The image processing unit 103 acquires the distance data corresponding to the coordinates of the subject region 702 from the distance map 700. In the distance map 700 in FIG. 7, as the distance data corresponding to the subject region 702 corresponds to the region "A," the image processing unit 103 acquires the distance data on the region "A".

Next, with "k" taken for the acquired distance data, the image processing unit 103 calculates the difference "dk" with respect to the distance data on each region in the distance map 700. The image processing unit 103 then uses a value n calculated by multiplying the difference "dk" by a predetermined coefficient to generate a kernel with a size of n×n and a coefficient p. Then, the image processing unit 103 uses the kernel generated for each region of the distance map 700 to perform convolution calculation on the still image generated in S601 so as to blur the image. This provides a refocus image in which the amount of blurring of the image varies according to the difference with respect to the distance data of the subject region 702. It should be noted that the refocus processing is not limited to the above-described processing; any known technology can be used.

As a result of the above-described refocus processing, a refocused image is generated in which the subject selected by the user is focused with the image blurred according to the difference of distance in the depth direction with respect to the subject. The generated refocused image is stored in the memory 105.

In S607, the system control unit 110 displays the refocused image held in the memory 105 on the display unit 107 as the playback image. Playback images are displayed one by one. When the user presses the forward button (not shown) or performs sliding operation on the touch panel, the playback image is replaced with the next image. Additionally, as another display method, the playback image may be reduced such that a plurality of the images are displayed on the display unit 107.

In S608, the system control unit 110 determines whether or not the last frame of the frames to be played back has been reached. If the last frame has been reached, the system control unit 110 returns the process to the flowchart in FIG. 3. If the last frame has not been reached, the system control unit 110 returns the process to S601 and performs the similar processing on the next frame as the frame to be processed.

As above, in the still image playback processing, refocused images are successively generated and displayed frame-by-frame in which the subject in the frames held in the refocus data is focused while being tracked.

Figure 8:
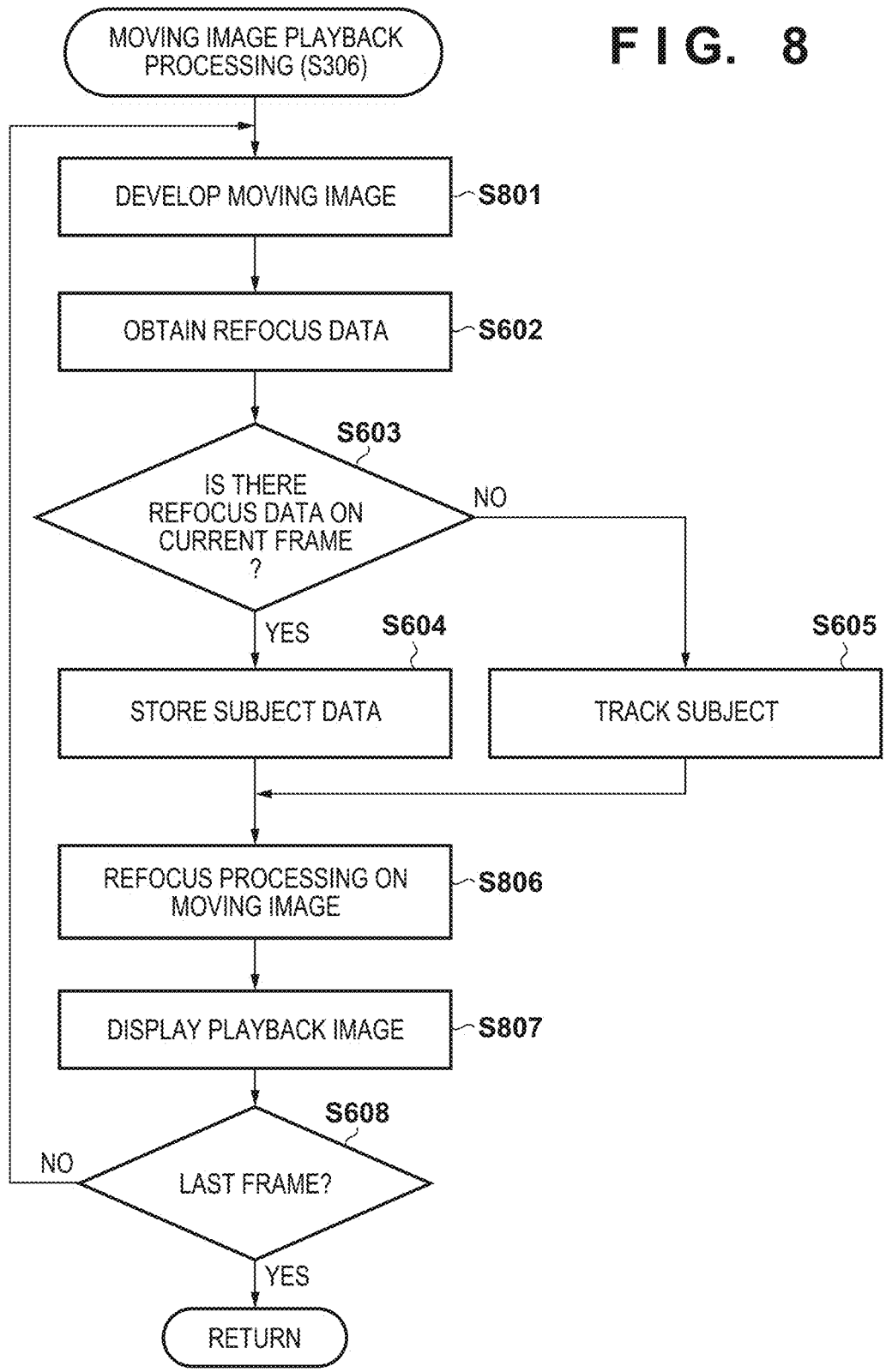
FIG. 8 is a flowchart showing details of moving image playback processing (S306 in FIG. 3).

Next, the moving image playback processing in S306 in FIG. 3 will be described with reference to FIG. 8. In FIG. 8, the steps where the same or similar processing to that in FIG. 6 is performed will be given the same reference numerals as those in FIG. 6, and description thereof will be omitted. In S801, the system control unit 110 reads out the RAW image data that corresponds to the frames currently being processed from the image file to be played back that is recorded in the recording medium 108 and stores the read-out data in the memory 105. The first frame to be processed is the top frame of the image file (if a range is selected on the frame selection screen 503 in FIG. 5B, it is the top frame in the selected range). Moreover, the system control unit 110 sets, in the image processing unit 103, development parameters that correspond to moving image playback and instructs the image processing unit 103 to perform development processing. The system control unit 110 stores the moving image data obtained by the development processing in the memory 105.

Figure 9:
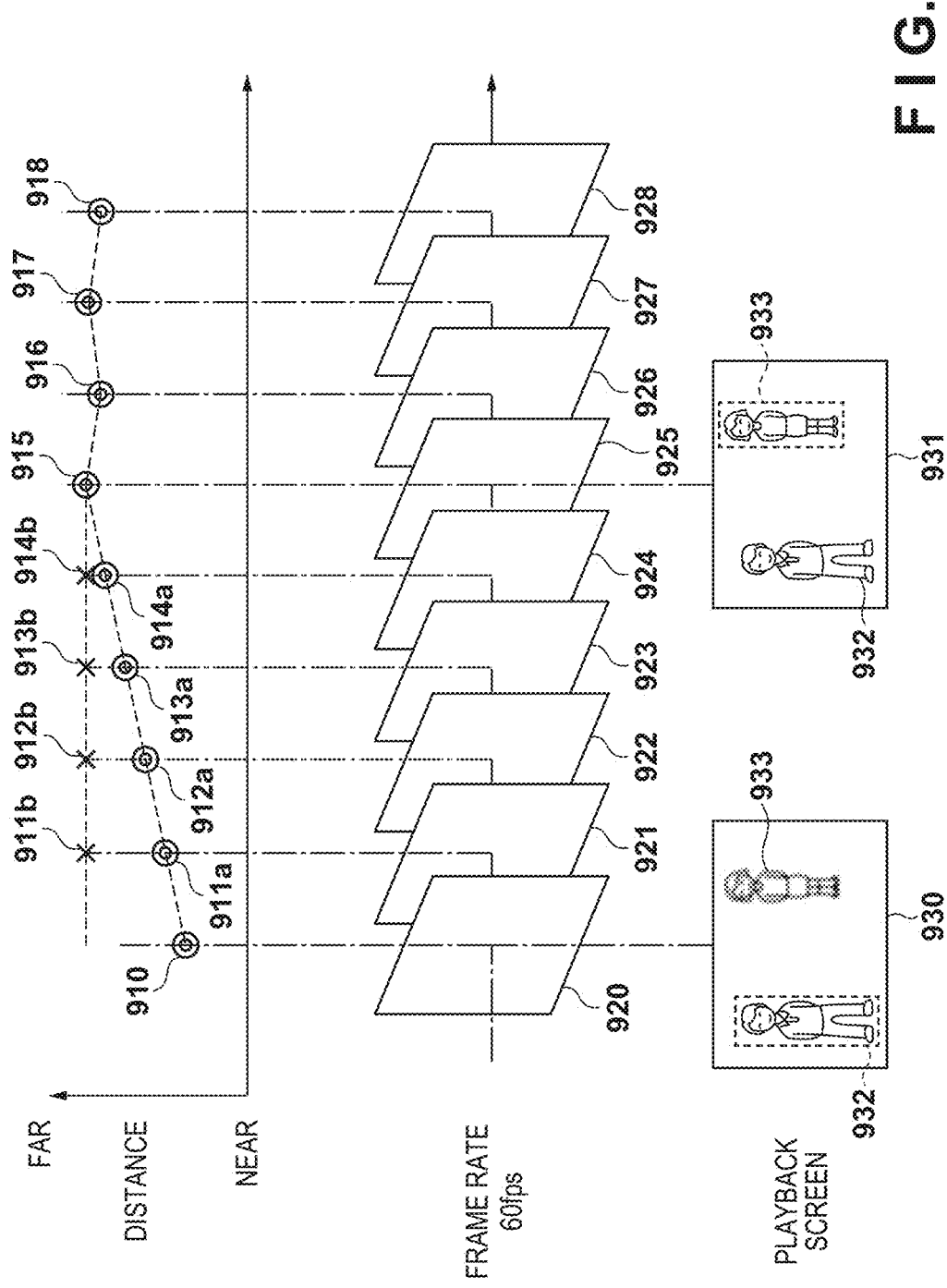
FIG. 9 is a conceptual diagram of moving image refocus processing.

In S806, the system control unit 110 performs moving image refocus processing. The moving image refocus processing will be described with reference to FIG. 9. The top section in FIG. 9 schematically shows the fluctuations of the focus distance, and the middle section in FIG. 9 schematically shows the frames to be played back. The frames 920 to 928 are arranged in the order of generation and played back at the frame rate of 60 fps. The lower section in FIG. 9 schematically shows the refocus images when the frames 920 and 925 are displayed on the display unit 107. The method of determining the focus distance in the moving image playback processing is different from that in the still image playback processing. In moving images, as continuity between frames influences the image quality, the image capturing apparatus 100 limits the fluctuation velocity of the focus distance to less than or equal to a threshold value.

Now, it is assumed that the frame 921 is to be processed. It is assumed that the focus distance of the immediately preceding frame 920 is the distance 910 and that, at this time, the subject 932 is in focus in the refocus image 930. In addition, it is assumed that, in the frame 921, the subject 933 has been selected to be focused. The system control unit 110 reads out the distance map that corresponds to the frame 921 from the recording medium 108 and stores it in the memory 105. The system control unit 110 detects the distance 911b of the subject 933 in the frame 921 based on the distance map. Now, if the focus distance in the frame 921 is set to the distance 911b, the amount of change from the distance 910 is large enough to render the moving image unnatural. Therefore, the system control unit 110 sets the distance 911a as the focus distance so that the focus distance tracks the subject 933 at a speed that is less than or equal to the threshold value. Then, the system control unit 110 generates a refocus image that is in focus at the distance 911a. The specific generation method is similar to that in S607 in FIG. 6.

As also for the frames 922 to 924, the distances of the subject are the distances 912b to 914b; however, as a result of limiting the velocity to less than or equal to the threshold value, refocus images that have focus distances of 912a to 914a are generated. As for the frames 925 to 928, the differences between the subject distances and the focus distances of the immediately preceding frames are small, and thus refocus images that have distances 915 to 918 that match the subject distances as their focus distances are generated. Therefore, the subject 933 is in focus in the refocused image 931.

As a result of the above-described refocus processing, a refocused image is generated in which the focus distance tracks the subject selected by the user over a plurality of frames at a speed that is less than or equal to a threshold value. The generated refocused image is stored in the memory 105.

It should be noted that the image capturing apparatus 100 may be configured to allow the user to determine the threshold value. For example, the image capturing apparatus 100 displays a threshold determination screen on the display unit 107, so that the user designates a desired threshold value on the threshold determination screen. The system control unit 110 determines the threshold value according to the user designation on the threshold determination screen.

In S807, the system control unit 110 displays the refocused image held in the memory 105 on the display unit 107 as the playback image. Unlike the still image playback processing (S607), the playback image is automatically replaced with the next image at the playback frame rate (for example, 60 fps). As such, after displaying the playback image, the system control unit 110 automatically advances the process to S608, successively displaying the playback images at the playback frame rate.

As described above, according to the first embodiment, the image capturing apparatus 100 generates playback images by performing refocus processing during the playback of the captured image data. The image capturing apparatus 100 determines the focus distance for the refocus processing according to the selected playback mode. This allows for focus control according to the use of the images.

Second Embodiment

Figure 3:
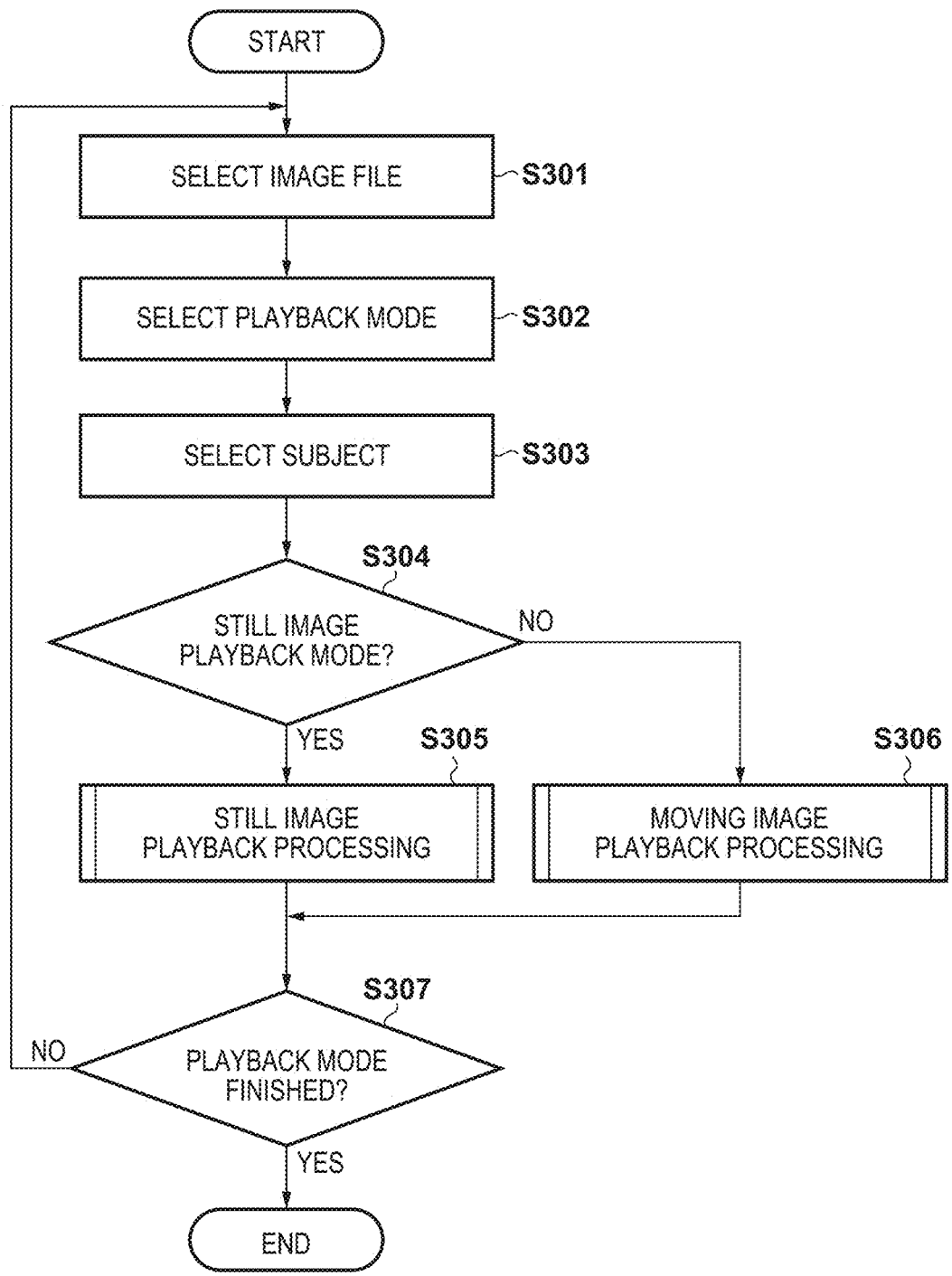
FIG. 3 is a flowchart showing playback processing performed by the image capturing apparatus 100.

In the first embodiment, a configuration in which refocus data is generated during playback has been described (see S303 in FIG. 3). Conversely, in the second embodiment, a configuration in which refocus data is generated during shooting will be described. In this embodiment, the basic configuration of the image capturing apparatus 100 is similar to the first embodiment (see FIG. 1). The following description mainly focuses on the differences with respect to the first embodiment.

Figure 10:
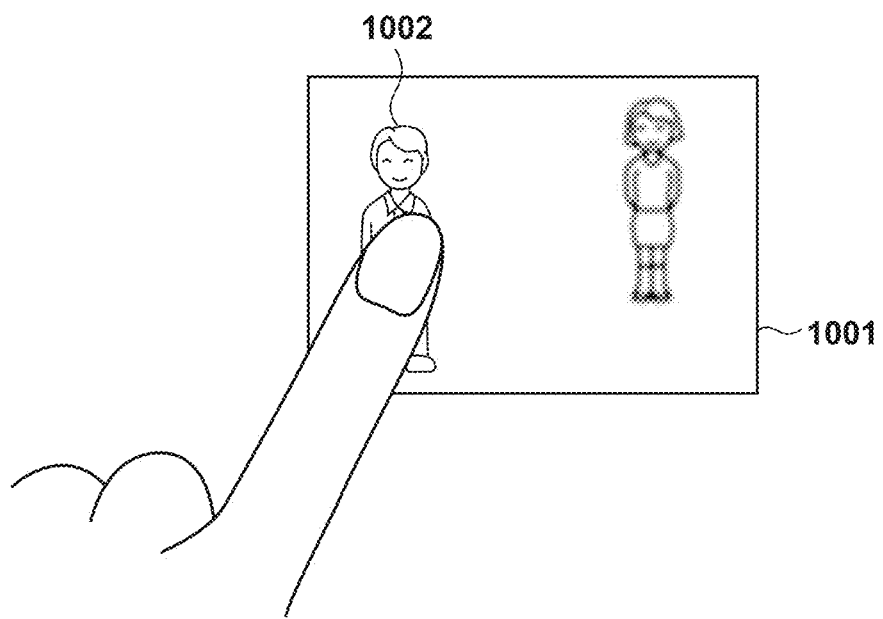
FIG. 10 is a schematic diagram of the screen shown on the display unit 107 during shooting.

FIG. 10 is a schematic diagram of the screen shown on the display unit 107 during shooting. The image 1001 is an image acquired by the image capturing apparatus 100 via the image sensor 102 during shooting. The user can select the subject to be focused by touch operation during shooting. In the example in FIG. 10, it is assumed that the user has touched the subject 1002. When the user touches the subject, the operation unit 113 receives a signal from the touch panel, converts this signal to the coordinates on the display screen, and output the coordinates to the system control unit 110. The system control unit 110 records position information that indicates these coordinates and the current frame number as refocus data in the recording medium 108. As for the next and later frames, the system control unit 110 detects the position of the subject by tracking the subject and records refocus data in the recording medium 108. Alternatively, the system control unit 110 may generate refocus data only on the frame at the timing when the user makes a touch without tracking the subject. The refocus data is recorded, for example, in the header section of the image file.

The playback processing is the same as in the first embodiment except for S303 in FIG. 3. In the second embodiment, in S303, the system control unit 110 detects that refocus data is included in the header section of the image file to be played back. In response to this detection, the system control unit 110 displays a message in the display unit 107 to confirm whether or not to use the refocus data in the image file. The user selects whether or not to use the refocus data in the image file via the operation unit 113. If the user uses the refocus data in the image file, the system control unit 110 performs the processing in S304 and later by using the refocus data in the image file.

Now, in the first embodiment, the image capturing apparatus 100 performs refocus processing based on the difference between the distance of the subject at each position and the focus distance in the captured image. In addition to this difference, however, the image capturing apparatus 100 of this embodiment performs refocus processing by using the design data on the lenses of the image capturing optical system 101. During refocus processing, the image capturing apparatus 100 generates refocus images by using the image processing unit 103 to calculate the amounts of blurring of the subjects located at distances other than the focus distances based on the design data on the lenses. It should be noted that, any known technology can be used for the technology for calculating the amount of blurring from the design data on the lenses.

Furthermore, in the second embodiment, the image capturing apparatus 100 determines the threshold value of the fluctuation velocity of the focus distance during moving image playback processing (see FIGS. 8 and 9) based on the design data on the lenses.

As described above, according to the second embodiment, the image capturing apparatus 100 generates refocus data used during playback according to the selection of the subject by the user during shooting. This enables the generation of refocus images reflecting the conditions of the shooting. Moreover, in this embodiment, as the image capturing apparatus 100 uses the design data on the lenses to perform refocus processing, it is possible to obtain image quality closer to that of an image subjected to optical focus control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   one or more processors; and
   a memory storing instructions which, when executed by the one or more processors, cause the image processing apparatus to function as:
   an acquiring unit configured to acquire a plurality of captured image data successively generated by an image capturing unit;
   a target position determining unit configured to determine, for each of the plurality of captured image data, a target position within an image of each captured image data;
   a selecting unit configured to select a first focus mode or a second focus mode;
   a focal position determining unit configured to determine, for each of the plurality of captured image data, a focal position in a depth direction at the target position; and
   a generating unit configured to generate, for each of the plurality of captured image data, an image which is in focus at the determined focal position, from the captured image data,
   wherein the focal position determining unit:
      determines the focal position for each of the plurality of captured image data such that a subject at the target position is in focus in each of the plurality of captured image data if the first focus mode has been selected by the selecting unit; and
      determines the focal position for each of the plurality of captured image data based on a difference between a subject position of current captured image data and the focal position of an immediately preceding captured image data, if the second focus mode has been selected by the selecting unit, such that:
         the subject at the target position is in focus, in a case where the difference is a first difference; and
         the focal position tracks the position at which the subject at the target position is in focus at a speed that is less than or equal to a threshold value, in an order of generation of the plurality of captured image data, in a case where the difference is a second difference larger than the first difference.

2. The image processing apparatus according to claim 1, wherein the acquiring unit further acquires distance information that indicates positions in the depth direction at a plurality of positions within the image, for each of the plurality of captured image data.

3. The image processing apparatus according to claim 2, wherein:
   each of the plurality of captured image data is data representing a captured image in pan focus; and
   the generating unit generates an image which is in focus at the determined focal position and is out of focus at other positions by performing, for each of the plurality of positions of the captured image, image processing to blur the captured image based on a difference between the distance information at the position and the determined focal position.

4. The image processing apparatus according to claim 1, wherein the target position determining unit determines, for each of the one or more images of the plurality of captured image data, the target position according to a user instruction.

5. The image processing apparatus according to claim 1, wherein:
   the acquiring unit further acquires, for each of the one or more images of the plurality of captured image data, position information indicating a specific position; and
   the target position determining unit determines, for each of the one or more of the captured image data, the position indicated by the position information as the target position.

6. The image processing apparatus according to claim 4, wherein for any captured image data other than the one or more images of the captured image data, the target position determining unit detects the position corresponding to the subject at the target position for the immediately preceding captured image data in the order of generation of the plurality of captured image data and determines the detected position as the target position for the captured image data.

7. The image processing apparatus according to claim 6, wherein if failing to detect the position corresponding to the subject at the target position for the immediately preceding captured image data, the target position determining unit detects the position corresponding to the subject at the target position for captured image data that precedes the immediately preceding captured image data.

8. The image processing apparatus according to claim 1, wherein the instructions, when executed by the one or more processors, further cause the image processing apparatus to function as a threshold value determining unit configured to determine the threshold value according to a user instruction.

9. An image capturing apparatus, comprising:
   the image processing apparatus according to claim 1; and
   the image capturing unit.

10. An image processing method performed by an image processing apparatus, comprising:
    acquiring a plurality of captured image data successively generated by an image capturing unit;
    determining, for each of the plurality of captured image data, a target position within an image of each captured image data;
    selecting a first focus mode or a second focus mode;
    determining, for each of the plurality of captured image data, a focal position in a depth direction at the target position; and
    generating, for each of the plurality of captured image data, an image which is in focus at the determined focal position, from the captured image data,
    wherein in the determining of the focal position:
      the focal position for each of the plurality of captured image data such that a subject at the target position is in focus is determined in each of the plurality of captured image data if the first focus mode has been selected in the selecting; and
      the focal position for each of the plurality of captured image data based on a difference between a subject position of current captured image data and the focal position of an immediately preceding captured image data, if the second focus mode has been selected by the selecting unit is determined such that:
        the subject at the target position is in focus, in a case where the difference is a first difference; and
        the focal position tracks the position at which the subject at the target position is in focus at a speed that is less than or equal to a threshold value, in an order of generation of the plurality of captured image data, in a case where the difference is a second difference larger than the first difference.

11. A non-transitory computer-readable storage medium which stores a program for causing a computer to execute an image processing method, the method comprising:
    acquiring a plurality of captured image data successively generated by an image capturing unit;
    determining, for each of the plurality of captured image data, a target position within an image of each captured image data;
    selecting a first focus mode or a second focus mode;
    determining, for each of the plurality of captured image data, a focal position in a depth direction at the target position; and
    generating, for each of the plurality of captured image data, an image which is in focus at the determined focal position, from the captured image data,
    wherein in the determining of the focal position:
      the focal position for each of the plurality of captured image data such that a subject at the target position is in focus is determined in each of the plurality of captured image data if the first focus mode has been selected in the selecting; and
      the focal position for each of the plurality of captured image data based on a difference between a subject position of current captured image data and the focal position of an immediately preceding captured image data, if the second focus mode has been selected by the selecting unit is determined such that:
        the subject at the target position is in focus, in a case where the difference is a first difference; and
        the focal position tracks the position at which the subject at the target position is in focus at a speed that is less than or equal to a threshold value, in an order of generation of the plurality of captured image data, in a case where the difference is a second difference larger than the first difference.

* * * * *